3,782,974
DIETETIC SALT SUBSTITUTE COMPOSITION
John Frank Lontz, 515 Eskridge Drive, Wilmington, Del. 19809, and Constance Anthony D'Alonzo, late of Wilmington, Del., by Shirley Bryant D'Alonzo, executrix of said Constance Anthony D'Alonzo, deceased
No Drawing. Filed Aug. 2, 1971, Ser. No. 168,454
Int. Cl. A23l 1/22
U.S. Cl. 426—229          3 Claims

ABSTRACT OF THE DISCLOSURE

A specific dietetic salt substitute formulation is provided from a proportionately defined combination of mono-, di- and tri-carboxylic acids comprising respectively ascorbic acid, fumaric acid, and citric acid to furnish a salty taste approximating that of natural sodium chloride and serving to satisfy the gustatory desire and thereby to provide for the therapeutic and preventive diminution of sodium intoxication and excess in hypertension and related health risks.

---

This invention relates to a novel dietetic salt substitute for use in the seasoning of prepared foods and in the preparation of food products. More particularly this invention relates to a formulation of chemical substances similar to or identical with those found in natural products. Still more particularly this invention provides non-toxic, safe and natural formulations for human consumption to provide a salt-like taste that will satisfy the gustatory desire for those whose intake of sodium chloride or bicarbonate needs to be restricted for reasons of health, or as a safeguard against the excessive intake of salt with its attendant sequelae.

It has been medically established and widely accepted that restriction of salt in the diet and drinking water is a vital factor in the treatment and regulation of chronic congestive heart failure, hypertension, certain types of kidney disease, advanced cirrhosis of the liver, and during pregnancy. Clinical and physiological studies have for some time indicated and demonstrated the risk to one's personal, good state of health and survival when the sodium chloride or bicarbonate intake is in excess of the minimal needs, or the so-called base line, that is usually established by the degree of hypertension and water retention. Many of these studies relate hypertension and vascular disease to salt intake of unrestricted or unregulated levels, and have shown restoration of normotension when the salt intake is reduced, or when a patient is put on a low-salt, or so-called salt-free diet. As a consequence numerous formulations have been devised to replace salt so that the palatability of the food in the diet is retained, as otherwise the patient drifts back to the use of salt, and eventually develops another of the same episodes of hypertension, or in some instances loses the appetite and brings on other problems or dangers to health or well being. Moreover, as a precaution, borderline patients, especially those of advanced years, unknowingly take in excess salt through drinking water that has a high sodium chloride or bicarbonate content, or in beverages and packed or salted meat and vegetable products that have been processed with sodium chloride, sodium bicarbonate, or salt condiments. Finally, by force of long-term habit, people sprinkle, often excessively, salt and other condiments more as a ritual than as a regulated intake of reasonably defined, medically permitted limits. However to require some individuals to maintain a disciplined regulation of their salt intake is more often a trial and error venture that soon finds the patient drifting again toward the ingestion of this crisplike astringent, and otherwise difficult to define absolutely, quality of salt to which he has been accustomed.

To overcome this obvious difficulty in maintaining a consistent, sustained restriction of salt in the diet, numerous formulations of substitutes have been devised and utilized with varying degrees of success, many containing chemical components that are viewed with caution as likely contributors to other physiological harm. Many of these are present or about to be regarded now as unsafe for human consumption. Many of the past formulations for use as dietetic salt substitutes are based on the replacement of the sodium cation with potassium, ammonium, lithium, and calcium on the one hand, and by anions such as the phosphates and glutamates, all of which introduce other excesses into the diet that may lead to other health dangers. Some of these formulations hardly fulfill the broad range of salt-like sensory reaction, because the biophysical mechanisms of taste as a neural response is quite complex, involving not only the initial sensation of the taste, but also its intensity, persistency, and aftertaste that cannot be as yet accurately defined or measured in some acceptable psychophysical scale. The substitution of the sodium cation by the potassium or ammonium is frequently cautioned against by the physician, as these cations can also lead to excesses that have other undesirable effects. In the case of potassium, prolonged utilization will lead to complications in the gastrointestinal tract, in the heart, or in musculature. In the case of ammonium, the activity of the cation is somewhat so specific to the mucusal areas of the nose and throat that the user abandons the use of the substitute entirely, and often returns to sodium chloride usage.

It has been found that the salt-like taste can be made acceptable to a tasting group of individuals by the use of a multi-component mixture of the anions of organic acids, provided that the mixture of selected anions are formulated in groups of well-defined chemical structures. This discovery came about by the realization that the replacement to some degree of the sodium cation by the hydrogen cation, such as does exist with organic acids, can be augmented by specific anions of organic acids. Furthermore, this replacement requires a highly restricted proportion, as an excess of any one, throws the salt-like taste into another taste that can be sour, bland, or excessively tart.

It is therefore the object of this invention to provide a dietetic salt substitute derived from a group of naturally occurring agents with a restrictive balance and ratio of (a) a monocarboxylic organic acid of a naturally occurring type with a single dissociation constant, (b) a dicarboxylic organic acid with two dissociation constants, and (c) a tricarboxylic acid with at least two dissociation constants. These dissociation constants are such as to be capable of providing a range of active cationic hydrogens. More specifically, the object of this invention is to provide specifically defined proportions of the mono-, di- and tricarboxylic acids whose structures are similar to those of their naturally occurring prototypes. Still more particularly the object of this invention is to provide a dietetic salt substitute substantially free of cations, including ammonium, and of cation substitutes of sodium. Still more particularly, the object of this invention is to provide a crystalline dietetic salt substitute requiring no special prescriptive directives, and also a substitute for prepared food items, condiments, and the like.

The objects of this invention have been attained by the discovery of a three-component mixture of organic acids preferred by a panel of tasters applying the mixtures of organic acid comprising (a) monobasic or mono dissociative organic acids, those eliminated from the serious include acetic, propionic, butyric, aminoacetic, aminopropionic (alanine), glyoxalic, gluconic, levulinic, and ascorbic acid, (b) dibasic or dissociative organic acids selected from the elimination of malonic, succinic, glutaric, adipic, malic, tartaric, maleic, fumaric acids, and (c) tribasic or tri-dissociative organic acids, notably citric acid. Following a preliminary rating for taste response described as sour, acidulant, tart, and bland, a taste panel of from three to six individuals narrowed the three-component formulation from a starter 1:1:1 admixtures of A, B, and C, which proved excessively acidulant with a prolonged after-taste as being by a majority as undesirable and even unpalatable by some, to a mixture of (A) ascorbic acid, (B) fumaric, and (C) citric acid. Following universal recognition and aversion to excess of the last-named citric acid, the taste panel, from statistical assessment of nearest similarity or approximation to common table salt, selected the following tabulated range of the three-component admixture of the crystalline salt substitute.

| Component | Acid | Proportion range |
|---|---|---|
| (A) Monocarboxylic | Ascorbic | 30 to 70. |
| (B) Dicarboxylic | Fumaric | 70 to 30. |
| (C) Tricarboxylic | Citric | 1 to 2. |

This synthetic formulation was found to be unique in several respects. Firstly, no known proportions of the above type have been found among the published analyses of natural plant foods, extracts, or prepared components thereof. Secondly, the ratio of the ascorbic acid to the fumaric acid was readily detected as the proportion of the fumaric acid exceeded the 70 to 30 proportionated range indicated in the above table. For instance, a proportion of ascorbic acid:fumaric acid of 20:80 was rejected by several panels as being excessively tart or acidulant. On the other hand, proportions of the ascorbic acid:fumaric in excess of 80:20 was immediately rejected as lacking any of salt-sour flavor, but rather one that was bland and even tended to be sweet. Further preferences were conducted as illustrated in the following examples.

EXAMPLE 1

The following series of crystalline or crystalline-like mixtures were made available to a tasting panel to rate the salt-like flavor sprinkled on single sections of celery stalks with results indicated in the following tabulation.

Seasoning: Panel rating
   (a) Common salt _____ 5 (best).
   (b) Proprietary mono sodium glutamate _____ 1 (lowest).
   (c) Formulation D-1: 70 parts ascorbic acid, 30 parts fumaric acid, 1 part citric acid _____ 3.
   (d) Proprietary formulation with potassium chloride, ammonium chloride, potassium glutamate, and other ingredients _____ 2.
   (e) Formulation D-4: 44.5 parts ascorbic acid, 44.5 parts fumaric acid, 1.0 part citric acid _____ 4.

While none of the above formulations approached common table salt universally among the panelists, although some were not able to distinguish between (a) and (c), the formulations (c) and (e) above were rated as acceptable salt substitutes that would not tire, so to speak, the user from continued dependence. Formulation (d) was advised against by the referring physician as having an excessive level of potassium along with an organic activator of the choline type not recommended for general usage, but only upon advice of the physician. The formulation based on sodium monoglutamate was least desirable because of a peculiar bland-to-sour or meaty after-taste with the celery.

This example purports to indicate that a universal dietetic salt substitute is available, provided the critical range of the three-component ingredient mixture is applied, a feature that would be substantiated by the fact that all of the organic acid ingredients are of the chemical structure found in many edible plants, vegetables, and fruits, but not replicated so restrictively as specified in this invention.

EXAMPLE 2

The same series of crystalline-like mixtures D-1 and D-4 were rated by the panel for a salad consisting of a quarter slice of lettuce and two tablespoonfuls of a 1:1 mixture of olive oil and vinegar, allowing the panel members to sprinkle each of the salt substitutes as generously as they were accustomed to. The preference ratings are based on 5-4-3-2-1 accumulated for each formulation and summed as shown.

Common salt _____ 25 (5-5-5-5-5)
MSG _____ 7 (1-2-3-2-3)
D-1 _____ 18 (4-3-4-3-4)
D-4 _____ 16 (3-4-3-4-3)
Proprietary (E) above _____ 7 (1-2-1-2-1)

While the common salt prevailed as the prime reference standard, the formulations D-1 and D-4 acquired reasonably close second or approximation.

Using the same salad preparation, the taste panel rated extensions of the D-1 and D-4 formulations in excess of range preferred with the following additional admixtures.

| Seasoning | Ingredients | | | Panel rating |
|---|---|---|---|---|
| | Ascorbic acid | Fumaric acid | Citric acid | |
| Common salt | | | | 25 |
| D-1 | 70 | 30 | 1 | 18 |
| D-4 | 44.5 | 44.5 | 1.0 | 17 |
| D-14 | 80 | 20 | 1 | 1 7 |
| D-19 | 20 | 80 | 1 | 2 8 |

1 Panel disclaimed salt-like flavor as excessively bland.
2 Panel singled out sour-like flavor.

The above test results indicate that a critical ratio or proportions prevails in this three-way formulation.

EXAMPLE 3

A series of unsalted butter patties were seasoned with 40 milligrams of various formulations including common table salt for taste control or reference for the panel to rate the salt-like quality or saltiness applied to unsalted milk crackers with results indicated in the following tabulation.

Seasoning in butter: Panel rating
   Common salt _____ 25 (5-5-5-5-5)
   Proprietary (D) in Example 1 ___ 15 (3-3-3-3-3)
   D-1 _____ 16 (4-4-2-2-4)
   D-4 _____ 14 (2-2-4-4-2)
   D-19 _____ 6 (1-1-1-1-2)

The taste rating results demonstrate the substantial equivalency of the salt substitute of this invention to the proprietary (D) product which is based on potassium salts and an active nerve ingredient which would be objected to by many physicians and would therefore not be suitable for the general purchase as an over-the-counter or food store item.

EXAMPLE 4

As in Example 1 the formulations were rated by another panel of five members by sprinkling over hamburg patties grilled over charcoal with preference rating summarized as follows, using packets of 40 milligrams for each patty.

| Seasoning | Panel rating 5 represents best |
|---|---|
| Common salt | 25 (5–5–5–5–5). |
| D–1 | 12 (several ties). |
| D–4 | 16 (several ties). |
| Proprietary D | 11 (several ties). |
| Mono sodium glutamate | 11 (several ties). |

Formulation D–4 provided a close approximation of the common salt, with prospects that a little higher amount of sprinkling could provide a higher rating.

The above examples thus demonstrate a consistent rating of the salt-like quality that is not only dependent upon the choice and ratio or proportions of the selected three, chemically defined ingredients, but also can be accepted from the standpoint of acceptable taste replicating in part that of the common salt. Each of the ingredients provided in the formulations are based on chemical structures that exist in nature and to which man has been exposed as dietary substances. The formulations provide a ready need for salt substitutes to alleviate the well-known and widely accepted conditions of hypertension and other health dangers related to excess intake of salt, a feature that people can hardly ascertain until after the condition of danger appears.

The manner in which the unique three-component mixture provides the quality of saltiness is not clear. Numerous studies and theories point to the role of the cation as an excitatory factor on taste receptors and that the anion effect is of an inhibitory character. The factors involved direct much emphasis to the binding of the anions onto the cell membranes which activate a response which rates in turn the qualities of the principal senses of salty to the sweet range. It is therefore not evident from the speculated concepts that the specific mixture of this invention could be predicted.

Medical examples of the use of the above dietetic substitute for salt are described as follows.

EXAMPLE 5

A 55-year-old nun had nephritis, nephrosis, and hypertension. She developed a distaste for the usual salt substitutes mentioned herein. Samples of the formulation D–1, described previously, were given to her for use in place of salt on her eggs, food, and meat. She was followed for two months on this formulation. Her initial blood pressure was 190/102–100. At the end of the two month period, three blood pressure readings were: 170/100–98; 172/98–96; 168/98–98. Her taste acceptance of formulation D–1 was most gratifying.

EXAMPLE 6

A 70-year-old male was afflicted with hypertensive arteriosclerotic cardiovascular heart disease, with a blood pressure reading of 210/110–106. He was given formulation D–4 for a two month period. His taste acceptance of it in lieu of free salt was most satisfactory, and he was able to follow a diet restricted to one gram of sodium chloride daily. At the end of the trail period his blood pressure reading was 180/106–100.

A 30-year old female was in her third pregnancy, and required a diurectic constantly to control her accumulation of excess fluid. Her ankles were edematous and her blood pressure reading was 150/98–96. With formulation D–4 described herein was given to her in her 7th month of pregnancy. She gained no weight during her 8th month and lost 3 pounds her 9th month due to her extensive restriction of ordinary salt and the substitution thereto of formulation D–4. Her blood pressure reading at the time of delivery was 140/94–92.

EXAMPLE 8

A long standing hypertensive arteriosclerotic cardiovascular patent with diabetes mellitus was in her early eighties. She was using the various salt substitutes now sold. She developed an aversion to these products, describing them as nauseatingly bitter, sickeningly meaty and distasteful. Moreover, due to previous multiple pregnancies and her diabetes, she had difficulty with urine retention. For these reasons, she disliked the usual diuretic medications generally given by mouth or subcutaneously. Therefore, rigid salt restriction was necessary, and salt substitutes now available were used, with the complaints listed. She was given a supply of formulation D–1 with excellent acceptance. She volunteered that this formulation had a persistant pleasant aftertaste and appeared to impart its own pleasant and characteristic taste as well. She lost 4 pounds the two months she was maintained on formulation D–1.

While the examples given above illustrate the preferences as applied to in solid, crystalline form, and one case on unsweetened butter, it is also useful to include the formulations in the preparation of numerous staple nutritionary items, such as bread, cookies, cakes, pies, wafers, prepared and packed meat products, artificial creamers, jams, jellies, condiments such as ketchup, mustard, and the like.

It is also possible and useful to replace portions of each of the principal three chemical categories with their equivalents and still attain the seasoning features. For instance, portions of the mono-substituted carboxylic acid, ascorbic acid, can be replaced by its oxidized form and still sustain the salt-like quality. As a hydroxy mono carboxylic acid, it is preferred for other reasons that ascorbic acid does have a value as a nutritional supplement and its excessive use is not known to be harmful, and indeed it may be beneficial for the well-being of the user of this type of a salt substitute. The structure of ascorbic acid is such that other six-membered hydroxy acids, such as gluconic and levulinic can be included as partial substituents.

From the initial taste, fumaric acid was chosen for its sharp, tart property which is then modified by the other two components. As an unsaturated dibasic acid it can be sutstituted in part with maleic acid, a feature common to commercial supplies of both acids, such substitution within the range of the indicated proportions will not impart any significant loss in the salt-like flavor. Other acids of this class include citraconic, mesaconic and itaconic acids, all isomeric homologs of maleic or fumaric acid group.

As was indicated by the initial panel screening taste the use of citric acid provides a quality as a third member that is indispensible to the formulation, yet it must be kept within the low limit indicated in the above description and examples, as otherwise the highly acidulating effect masks that unique, undefinable, saline-like quality.

What is claimed is:

1. A dietetic salt substitute composition consisting of 30 to 70 parts by weight of ascorbic acid, 70 to 30 parts by weight of fumaric acid and 1 to 2 parts by weight of citric acid.

2. A dietetic salt substitute composition consisting of 30 parts by weight of ascorbic acid, 70 parts by weight of fumaric acid and 1 part by weight of citric acid.

3. A dietetic salt substitute of claim 1 in the form of a sprinkling composition.

References Cited

UNITED STATES PATENTS 2,511,804  6/1950  Hall et al. _____ 99—143 X

FOREIGN PATENTS 421,554  12/1934  Great Britain _____ 99—143

DAVID M. NAFF, Primary Examiner

U.S. Cl. X.R.

424—365